United States Patent [19]

Dammann et al.

[11] Patent Number: 4,855,383

[45] Date of Patent: Aug. 8, 1989

[54] IN SITU QUATERNARY AMMONIUM CATALYST FORMATION FOR CURING POLYMERIC ISOCYANATES

[75] Inventors: Laurence G. Dammann; Brent A. Blakley, both of Westerville; Gary M. Carlson, Dublin, all of Ohio

[73] Assignee: Ashland Oil, Inc., Ashland, Ky.

[21] Appl. No.: 248,805

[22] Filed: Sep. 23, 1988

[51] Int. Cl.$^4$ .............................................. C08G 18/02
[52] U.S. Cl. ....................... 528/51; 528/52; 528/53; 528/54; 528/73
[58] Field of Search ................ 528/51, 52, 53, 57, 528/73

[56] References Cited

U.S. PATENT DOCUMENTS

| | | | |
|---|---|---|---|
| 3,010,963 | 11/1961 | Erner | 544/351 |
| 3,211,703 | 10/1965 | Gillman et al. | 428/285 |
| 3,487,080 | 12/1969 | Matsui et al. | 544/193 |
| 3,919,218 | 11/1975 | Schmitt et al. | 544/222 |
| 3,980,594 | 9/1976 | Fabris et al. | 528/52 |
| 3,995,997 | 12/1976 | Boehmke et al. | 8/527 |
| 4,040,992 | 8/1977 | Bechara et al. | 521/117 |
| 4,288,586 | 9/1981 | Bock et al. | 528/67 |
| 4,324,879 | 4/1982 | Bock et al. | 528/45 |
| 4,521,545 | 6/1985 | Kerimis et al. | 521/107 |
| 4,560,494 | 12/1985 | Druetzler | 560/158 |
| 4,608,407 | 8/1986 | Kerimis et al. | 524/14 |
| 4,680,222 | 7/1987 | Anton | 428/251 |
| 4,728,676 | 3/1988 | Müller et al. | 521/107 |
| 4,788,224 | 11/1988 | Müller et al. | 521/104 |

FOREIGN PATENT DOCUMENTS 1150080 6/1958 Fed. Rep. of Germany .

Primary Examiner—Maurice J. Welsh
Assistant Examiner—L. Henderson
Attorney, Agent, or Firm—Mueller and Smith

[57] ABSTRACT

Disclosed is a curable composition suitable for use as a coating, adhesive, or the like which comprises a storage-stable, liquid composition comprising an isocyanate-functional compound (e.g. monomer, oligomer, or polymer), an epoxy component, and an alkylating agent; and a tertiary amine catalyst precursor. Upon admixing of the liquid composition and tertiary amine, the tertiary amine forms a quaternary ammonium salt in situ for achieving cross-linking of said isocyanate-functional compound.

22 Claims, No Drawings

IN SITU QUATERNARY AMMONIUM CATALYST FORMATION FOR CURING POLYMERIC ISOCYANATES

BACKGROUND OF THE INVENTION

The present invention relates to curing of isocyanates in the presence of quaternary ammonium catalysts and more particularly for a unique method for producing such catalyst in situ.

Quaternary ammonium salts are known to be efficient trimerization catalysts and are known to be effective in making isocyanurate-type polyisocyanates. Trimerization of isocyanates into isocyanurates is a reaction that can be continued for formation of coatings, adhesives, elastomers and plastics, and like products. The isocyanate trimerization reaction, and resulting cure, can be represented as follows:

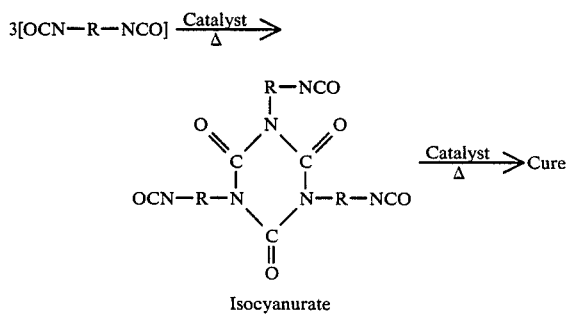

The trimerization reaction usually requires some heat even in the presence of quaternary ammonium catalysts. The predominant form of the quaternary ammonium catalyst comprises quaternary ammonium hydroxide salts as proposed by German Pat. No. 1,150,080.

U.S. Pat. No. 3,211.703 proposes to make quaternary ammonium hydroxide catalysts for isocyanate trimerization by reacting a tertiary amine and an epoxide. U.S. Pat. No. 3,919,218 proposes the use of aziridine and a tertiary amine co-catalyst that can be destroyed by heat in the trimerization reaction. U.S. Pat. No. 3,487,080 proposes trimerization of isocyanates in the presence of quaternary ammonium hydroxides plus a compound selected from a phenol, an oxime, or methanol. U.S. Pat. No. 4,040,992 conducts the trimerization reaction utilizing shortened carboxylic acid salts of quaternary ammonium hydroxyl compounds. U.S. Pat. No. 4,288,586 proposes the use of quaternary hydroxyalkyl ammonium hydroxides containing at least one hydroxyalkyl group in the polymerization of isophorone diisocyanate. U.S. Pat. No. 4,324,879 proposes the use of quaternary ammonium hydroxyl catalysts with the hydroxy group of the hydroxyalkyl substituent at the two position with respect to the nitrogen atom. U.S. Pat. No. 4,560,494 also shows the use of quaternary ammonium hydroxyl salts in isocyanurate formation. Finally, general synthesis schemes for forming quaternary ammonium hydroxyl salts also can be found in U.S. Pats. Nos. 3,010,963 and 3,995,997.

It is well documented that tertiary amines react with epoxy groups to form a Zwitterionic species which is in equilibrium with its two reaction components. While such zwitterionic species probably is an effective trimerization catalyst, formation of significant catalytic quantities thereof requires large amounts of reactants because of the equilibrium involved. If the zwitterionic species could be stabilized, e.g. through a non-equilibrium reaction, small quantities of reactants then could be used for producing effective trimerization catalysts.

BROAD STATEMENT OF THE INVENTION

The present invention is directed to a one-pack, storage-stable, isocyanate-functional composition useful for forming a coating, adhesive, elastomer, or like article. Curing of the composition involves trimerization of the isocyanate groups in the presence of a quaternary ammonium salt catalyst which is formed in situ upon application of the composition. The present method for curing the inventive composition comprises formulating a liquid composition comprising an isocyanate-functional compound, an epoxy component, and an alkylating agent, said composition being storage stable. When it is desired that the composition be cured, it is admixed with a tertiary amine and the mixture applied onto a substrate. The tertiary amine pre-cursor catalyst forms a quaternary ammonium salt catalyst in situ for achieving cross-linking by trimerization of the isocyanate compound. Cure often also is accompanied by heating of the applied composition. The composition itself forms another aspect of the present invention.

An advantageous application technique of the present invention involves the concurrent generation of an atomizate of the curable composition and a tertiary amine which then are admixed and the mixture applied onto a substrate, in the manner proposed in U.S. Pat. No. 4,517,222.

Advantages of the present invention include the ability to formulate liquid compositions which possess outstanding storage stability, yet which can be effectively and efficiently cured when desired. Another advantage is the ability to formulate the active catalyst species in situ at the time of application of the composition for its curing. Another advantage is the flexibility in combining the tertiary amine and liquid coating composition which admixture is curable. These and other advantages will be readily apparent to those skilled in the art based upon the disclosure contained herein.

DETAILED DESCRIPTION OF THE INVENTION

As described above, an epoxide reacts with the tertiary amine to form a quaternary ammonium hydroxide zwitterionic species which is an effective trimerization catalyst. In order to stabilize the zwitterionic species, it unexpectedly has been discovered that an alkylating agent reacts therewith in a non-equilibrium reaction to form a quaternary ammonium salt which also is an effective trimerization catalyst. This reaction is illustrated below:

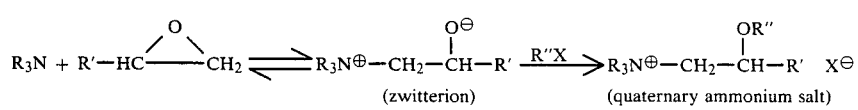

Implementation of such quaternary ammonium salt stabilization revolves around the unexpected discovery that isocyanate-functional prepolymers can be combined with a small, yet effective amount of an epoxide and an alkylating agent to form a curable composition which is one-pack stable for extended periods of time ranging up to one year or more. Concomitant with such stability is the ability to still effect trimerization cure merely upon blending of the coating composition with a tertiary amine, often followed by heating as is conventional in trimerization cure technology.

The application of a curable composition in the presence of a tertiary amine is the general principle behind vapor permeation curable coatings. Vapor permeation curable coatings traditionally are a class of coatings formulated from hydroxyl-functional polymers (usually aromatic) and multiisocyanate cross-linking agents wherein applied film thereof is cured by exposure to a vaporous tertiary amine catalyst. General techniques for combining the urethane-forming coating composition and tertiary amine catalyst include curing chambers (e.g. U.S. Pats. Nos. 4,491,610 and 4,520,750) and the spray catalyst cure process (U.S. Pat. No. 4,517,222). Vapor permeation curable coatings are implemented commercially for a variety of applications. The present invention, then, enables isocyanate trimerization curable compositions to be handled, applied, and cured in accordance with the same procedures already familiar in the industry for urethane vapor permeation curable coatings.

Referring initially to the quaternary ammonium salts useful in isocyanate trimerization cure, initial reference is made to the art described in the Background. Such art describes numerous quaternary ammonium salts which are effective in isocyanate trimerization and isocyanurate formation. This art also teaches that the quantity of catalyst ranges from about 0.001 to about 5% by weight of the isocyanate involved. It will be appreciated that when vapor amine processing is employed, the quaternary ammonium catalyst will be based on a tertiary amine which suitably can be handled and used in accordance with such techniques. These tertiary amines include, for example, triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and the like and mixtures thereof. When the tertiary amine remains in the liquid phase for admixture with the curable composition, an even broader list of tertiary amines is appropriate, as those skilled in this art will appreciate.

Referring now to the isocyanate-functional compound, an isocyanate-functional monomer, oligomer, or polymer which can be cured by trimerization is appropriate for use in accordance with the precepts of the present invention. That is, while isocyanate-functional oligomers and polymers (e.g. so-called moisture curable urethanes) can be used, it also is appropriate to use isocyanate monomers which can be trimerized into the corresponding isocyanurate which then cures into the final polymeric network.

Broadly, polyisocyanates will have from about 2-4 isocyanate groups per molecule for use in the composition of the present invention. Suitable polyisocyanates include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris(4-isocyanatophenyl) thiophosphate, cyclohexane diisocyanate (CHDI), bis-(isocyanatomethyl) cyclohexane ($H_6$XDI), dicyclohexylmethane diisocyanate ($H_{12}$MDI), trimethylhexane diisocyanate, trimethyl hexamethylene diisocyanate, dimer acid diisocyanate (DDI), lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

Conventional moisture-curable polyurethane coatings typically contain levels of isocyanate groups ranging from about 1-5% by weight. While such compositions are designed to cure by the absorption of moisture into an applied film thereof, such compositions also can be cured by trimerzation in accordance with the present invention. "Moisture-curable polyurethane coating compositions" comprehend an isocyanate-terminated prepolymer containing between 1 and 5% isocyanate groups. While the art is replete in moisture-curable polyurethane coating compositions, some representative systems can be found, for example, in U.S. Pats. Nos. 3,705,132, 3,642,943, 4,469,831, and 3,919 173. Such moisture-curable polyurethane coatings conventionally contain non-aqueous volatile organic solvent systems, pigments, fillers, extenders, additives, flow leveling agents, U.V. stabilizers, and like conventional additives depending upon the precise intended application of the formulation. Such additives certainly are appropriate for the curable composition of the present invention.

Referring now to the epoxy component, the epoxy functionality can be provided, for example, by glycidyl acrylate, glycidyl methacrylate, allyl glycidyl ether, alpha-olefin epoxides, 1,4-butanediol diglycidyl ether, diglycidyl ethers of bis-phenol A, epoxy novolacs, cresyl glycidyl ether, phenyl glycidyl ether, resorcinyl diglycidyl ether, cycloaliphatic epoxides, glycidyl ethers of polyether polyols and castor oil, glycidyl ester of Versatic acid (Cardura E, Shell Chemical Co.), epoxidized fatty acids, and the like. Monomeric and lower molecular weight epoxies are preferred, compared to higher molecular weight epoxies, in order that steric hindrance and bulky molecules do not interfere with the reaction with the tertiary amine. Other representative epoxies are detailed in the art discussed in the Background section hereof. The proportion of epoxide should be approximately stoichiometric with the tertiary amine quantity, which, in turn, is based upon the proportion of quaternary ammonium salt catalyst intended for the curable composition.

Referring to the alkylating agent which stabilizes the Zwitterionic species, such alkylating agents generally are composed of anions which serve as the anionic counterpart to the quaternary ammonium catalyst and include halides, nitrates, carbonates, hydroxides, phosphates, sulfates, acetates, formates, citrates, propionates, tartrates, and the like. The remaining portion of the alkylating agents typically are lower alkyl groups ranging from about 1 to 8 carbon atoms though some cycloaliphatic and aromatic alkylating agents possess the requisite degree of reactivity for use in accordance with the precepts of the present invention. Long-chain alkylating agents tend to be rather recalictrant in reacting and, thus, are better avoided. A somewhat unusual alkylating agent for present purposes also comprehends moisture (i.e. water) which is believed to stabilize the intermediate Zwitterionic species. Again, the proportion of alkylating agent is adjusted to be approximately stoichiometric with the proportion of quaternary ammonium catalyst being formed.

As noted above, the tertiary amine can be admixed with the curable composition and applied as a film for forming a surface coating, as an adhesive for a variety of uses, as a three-dimensional form for formation of elastomer, or like uses. Heat, e.g. between about 50° and 175° C. for about 5 to 120 minutes also generally will be used. In general, aliphatic isocyanate-terminated prepolymers typically require a somewhat higher bake and longer time period than do aromatic isocyanate-terminate prepolymers. Alternatively, the tertiary amine can be generated in vaporous form, e.g. utilizing a vapor generator as in U.S. Pat. No. 4,540,543, and conventional vapor permeation curable processing applied to the composition utilizing chamber cure or spray catalyst cure as described above. Regardless of the technique employed, the effective admixture of the curable composition and tertiary amine result in the in situ formation of a quaternary ammonium salt catalyst which is effective in the trimerization and cure of the isocyanate-functional compound contained in the composition.

The following examples show how the present invention has been practiced but should not be construed as limiting. In this application, all percentages and proportions are by weight and all units are in the metric system, unless otherwise expressly indicated. Also, all citations referred to herein are expressly incorporated herein by reference.

IN THE EXAMPLES

EXAMPLE 1

In order to demonstrate the in situ quaternary ammonium catalyst formation for isocyanate trimerization, Spenlite M22-X-40 aliphatic polyurethane resin solution (isophorone diisocyanate-based moisture curable urethane in xylol/methoxy propyl acetate (95/5) solvents, 39–41 wt-% solids, 0.5–1.1 stokes viscosity, 9.01 lbs/gal density, 26° C. closed cup flash point, Spencer Kellogg Products, NL Industries, Inc., Hightstown, N.J.) was evaluated with various combinations of bromobutane and phenyl glycidyl ether. Each formulation was sprayed with 0.7 vol-% DMEOLA (dimethyl ethanol amine) accordance with U.S. Pat. No. 4,517,222 onto Bonderite 37 panels and then baked for 3 minutes at 121° C. (250° F.). Each coating then was visually inspected following panel removal from the oven and MEK rub tests conducted at specified time intervals thereafter. The following data was recorded.

TABLE 1

| Run No. 4541- | Ingredient Type | Amt (g) | Initial Cure out of Oven | MEK Double Rubs Time After Bake 5 min | 1 hr | 24 hr |
|---|---|---|---|---|---|---|
| 157-1 | Spenlite | 70 | Very Tacky | 4 | 10 | 48 |
| 157-2 | Spenlite | 70 | Very | 10 | 13 | 55 |

TABLE 1-continued

| Run No. 4541- | Ingredient Type | Amt (g) | Initial Cure out of Oven | MEK Double Rubs Time After Bake 5 min | 1 hr | 24 hr |
|---|---|---|---|---|---|---|
|  | Bromobutane | .7 | Tacky |  |  |  |
| 157-3 | Spenlite Phenyl glycidyl ether | 70 .7 | Tacky | 7 | 9 | 90 |
| 157-4 | Spenlite Bromobutane Phenyl glycidyl ether | 70 .7 .7 | Dry | 31 | 27 | 99 |

This data demonstrates the necessity of the amine/epoxy/alkylating agent combination for achieving trimerization cure of an aliphatic isocyanate via in situ quaternary ammonium salt formation. The early film development data is most telling of the speed and degree of cure achieved.

EXAMPLE 2

The affect of the presence of the epoxy component and the alkylating agent (1 wt-% level each) was evaluated with Spenkel M86-A6X-50 aromatic polyurethane resin solution (3.8% NCO content, NL Industries). Each formulation was evaluated for its stability and solvent resistance at room temperature (RT) and after baking at 121° C. (250° F.) for 5 minutes (HT). The 0.7 vol-% DMEOLA spray cure process again was used to apply the formulations onto Bonderite 37 panels.

TABLE 2

| Formulation No. 4541- | Ingredient | 24 hr Stability | MEK Double Rubs 1 hr RT | HT | 24 hr RT | HT |
|---|---|---|---|---|---|---|
| 94-1 | M86 | yes | 11 | 23 | 84 | 153 |
| 94-2 | M86 Epon 826* | yes | 15 | 33 | 100 | 135 |
| 94-3 | M86 1,2-Dibromobutane | yes | 13 | 27 | 95 | 140 |
| 94-4 | M86 Epon 826 1,2-Dibromobutane | yes | 35 | 100 | 157 | 237 |

*Epon 826 is the diglycidyl ether of bis-phenol A, Shell Chemical Co., Houston, Texas.

Again, the unique in situ quaternary ammonium catalyst formation is demonstrated, this time for an aromatic isocyanate rather than an aliphtic isocyanate as in Example 1.

EXAMPLE 3

The formulations of Example 2 were evaluated again except that various phenolic compounds replaced the dibromobutane alkylating agent. The same spray cure and ingredient levels were used as per Example 2.

TABLE 3

| Formulation No. | Ingredient | Initial Cure out of oven | MEK Double Rubs 5′ at RT and 5′ at 250° F. |
|---|---|---|---|
| 108-3 | M86 Epon 826 | Dry | 35 |
| 113-1 | M86 Propylene Carbonate | Very soft Tacky | 14 |
| 113-2 | M86 Epon 826 Propylene Carbonate | Dry | 43 |

TABLE 3-continued

| Formulation No. | Ingredient | Initial Cure out of oven | MEK Double Rubs 5' at RT and 5' at 250° F. |
|---|---|---|---|
| 113-5 | M86 MEHQ* | Tacky | 10 |
| 113-6 | M86 Epon 826 MEHQ | Dry | 50 |
| 113-3 | M86 Methyl p-hydroxybenzoate | Tacky | 11 |
| 113-4 | M86 Epon 826 Methyl p-hydroxybenzoate | Tacky | 15 |
| 113-7 | M86 Ethanox 330** | — | 14 |
| 113-8 | M86 Epon 826 Ethanox | — | 17 |

*MEHQ is p-methoxyphenol
**Ethanox 30 is a hindered phenol, Ethyl Corp., Baton Rouge, Louisiana.

These data demonstrate that propylene carbonate and p-methoxyphenol (MEHQ) both are effective alkylating agents in the in situ formation of ammonium catalysts, but that methyl hydroxybenzoate (methyl paraben) and the hindered phenol (Ethanox 330) are not.

DMEOLA catalyst on Bonderite 37 panels. Results recorded are as follows:

TABLE 4

| Formulation No. 4541 | Ingredient | Cure Time (min) | MEK Double Rubs | | | |
|---|---|---|---|---|---|---|
| | | | 1 Hr | | 24 Hr | |
| | | | RT | HT | RT | HT |
| 78-1 | Mondur HC | 3 | 40 | 36 | 100 | 255 |
| 78-2 | Mondur HC Epon 826 (1%) | 5 | 36 | 55 | 200 | 250 |
| 78-4 | Mondur HC CH₃I (1%) | 3 | 40 | 45 | 120 | 250 |
| 78-5 | Mondur HC Epon 826 (1%) CH₃I (1%) | 2 | 70 | 72 | 250 | 250 |

Again, the above-tabulated data establishes the efficacy of the present invention.

EXAMPLE 5

Isocyanate-functional urethane prepolymers (labeled Composition in Table 5) were synthesized, combined with 3 wt-% Epon 826 and 1.5 wt-% 1-bromooctane to form Formulation series 4734- (50% non-volatiles solids content), and then spray cured with 0.6 vol-% DMEOLA. Each coated Bonderite 1000 panel then was baked for ten minutes at 121° C. (250° F.). The following data was recorded for prepolymer:solvent weight ratios of 50:6.5 (except 4734–142 which was 50:6.9).

TABLE 5

| Formulation No. 4734- | Composition No. | Ingredients* | Prepolymer Eq Ratio | Eq Wt | Functionality | Solvent* | MEK Double Rubs | |
|---|---|---|---|---|---|---|---|---|
| | | | | | | | 5 Min | 1 Hr |
| 132-1 | 4647-48 | Tone 0301/0310 IPDI | 1 2 | — | 3 | MEK/MIBK (1:1) | 25 | 29 |
| 132-2 | 4541-173 | Tone 0301 IPDI | 1 2 | 646 | 3 | Butyl Acetate | 30 | 57 |
| 132-4 | 4541-182 | Tone 0305 IPDI | 1 2 | 807 | 3 | MIBK | 37 | 73 |
| 163-2 | 4734-135 | TMP TMHDI | 3 5 | 477 | 4 | MIBK | 250 | 300 |
| 163-3 | 4734-138 | TMP TMHDI | 1 2 | 385 | 3 | MIBK | 59 Tacky | 60 Tacky |
| 163-4 | 4734-139 | Tone 0305 TMHDI | 3 5 | 748 | 4 | MIBK | 25 Tacky | 30 Tacky |
| 163-6 | 4734-150 | Tone 0305 TMHDI | 3 5 | 777 | 4 | MAK | 40 Tacky | 40 Tacky |
| 163-2 | 4734-162 | PEP550 TMHDI | 1 2 | 315 | 4 | MIBK | 225 | 260 |

*IPDI is isophorone diisocyanate
TMP is trimethylol propane
TMHDI is trimethyl hexane diisocyanate
MIBK is methyl isobutyl ketone
MAK is methyl amyl ketone
PEP 550 is a tetrafunctional polyether polyol, BASF Wyandotte Corp., Wyandotte, Mi.

EXAMPLE 4

Additional evaluation of the invention was undertaken using Mondur HC polyisocyanate (tetrafunctional reaction product of hexamethylene diisocyanate and toluene diisocyanate, 11.5% NCO content, equivalent weight of 365, 60% solids in Cellosolve acetate/xylene, Mobay Chemical Co., Pittsburgh, Pa.) These polymers were reduced to spray viscosity with ethyl-3-ethoxy propionate, then spray cured with 0.7 vol-%

These results confirm that a variety of isocyanate prepolymers can be cured by trimerization utilizing the in situ quaternary ammonium catalyst.

EXAMPLE 6

Resin 4647-48 of Example 5 (50 g) was mixed with various t-amines (0.5 g) only, in the A runs, and with various t-amines (0.5 g) plus 1,2-dibromobutane (.5 g) and phenyl glycidyl ether (.5 g) in the B runs. The time to gel then was recorded in minutes.

TABLE 6

| Formulation 4734-95/96 | t-Amine* | **Gel Time (min) | |
|---|---|---|---|
| | | Room Temp | 60° C. |
| 1A | N—N—dimethylcyclohexylamine | N.G. | 240 |
| 1B | N—N—dimethylcyclohexylamine | 480 | 240 |

TABLE 6-continued

| Formulation 4734-95/96 | t-Amine* | **Gel Time (min) Room Temp | 60° C. |
|---|---|---|---|
| | + 1,2-dibromobutane/phenyl glycidyl ether | | |
| 2A | Dimethylethanol amine | N.G. | 240 |
| 2B | Dimethylethanol amine + 1,2-dibromobutane/phenyl glycidyl ether | 180 | 210 |
| 3A | Dimethylbenzyl amine | N.G. | 240 |
| 3B | Dimethylbenzyl amine + 1,2-dibromobutane/phenyl glycidyl ether | 480 | 240 |
| 4A | DABCO | 480 | 240 |
| 4B | DABCO + 1,2-dibromobutane/phenyl glycidyl ether | 120 | 60 |
| 5A | Polycat 41 | 480 | — |
| | Polycat 41 + 1,2-dibromobutane/phenyl glycidyl ether | 480 | — |
| 6A | Pyridine | N.G. | 240 |
| 6B | Pyridine + 1,2-dibromobutane/phenyl glycidyl ether | N.G. | 240 |
| 7A | Diazobicycloundecane | 480 | 180 |
| 7B | Diazobicycloundecane + 1,2-dibromobutane/phenyl glycidyl ether | 30 | 25 |

*DABCO is triethylene diamine, Air Products Co., Allentown, Pa. Polycat 41 is a proprietary tertiary amine, Air Products Co., Allentown, Pa.
**N.G. is no gel after 24 hours.

These results show some unusual amines that function to in situ make the quaternary ammonium catalysts and one amine, viz pyridine, that did not under the conditions prevailing. Note that 60° C. is sufficiently high that cure proceeds almost without regard to the presence or absence of catalyst.

EXAMPLE 7

Two different formulations were compounded and studied for longterm storage stability as follows:

TABLE 7A

| Formulation No. | Ingredient | Amt (g) | Init | Viscosity (cps) 1 mo | 2.5 mo | 3.5 mo |
|---|---|---|---|---|---|---|
| 4541-125-1 | Chemglaze Z001* | 110 | 15 | 15 | 17.5 | 20 |
| | Epon 826 | 2 | | | | |
| | 1,2-Dibromobutane | 2 | | | | |
| 4541-125-2 | Spenlite M22-X-40 | 110 | 112.5 | — | 112.5 | 150 |
| | Epon 826 | 2 | | | | |
| | 2,1-Dibromobutane | 2 | | | | |

*Chemglaze Z001 is an aromatic NCO-terminated polyurethane prepolymer clear coat, Lord Corporation, Erie, Pa.

In fact, formulation No. 125-1 was stable, ungelled, for one year while Formulation No. 125-2 was stable for over 6 months. After 3.5 months of storage, each formulation was sprayed with 0.7 vol-% DMEOLA onto glass and baked for 5 minutes at 250° F.

TABLE 7B

| Formulation No. | MEK Double Rubs 5 min. | 1 hr. |
|---|---|---|
| 4541-125-1 | 50 | 75 |
| 4541-125-2 | 15 | 30 |

These results demonstrate the long-term storage stability of the formulations sans t-amine. Yet, even after extended storage, in situ catalyst formation readily ensues.

EXAMPLE 9

Chemglaze A-276 moisture-cure isocyanate terminated urethane resin solution (white color, 54 wt-% solids, 250 cps viscosity, 9.4 lb/gal density, 19.3° C. closed cup flash point, Lord Corp., Erie, Pa.) was evaluated on glass and cold rolled steel panels (CRS) as follows:

TABLE 8

| Formulation No. | Ingredient | Amt (g) | Substrate | Bake Temp. °F. | MEK Double Rubs Time (min) 5 min | 1 hr | 24 hr | |
|---|---|---|---|---|---|---|---|---|
| 4541-158-1 | A-276 | 50 | Glass | 180 | 5 | 31 | 37 | 156 |
| | 1-Bromooctane | 1 | | | | | | |
| | Phenyl glycidyl ether | 1 | | | | | | |
| | MIBK | 4 | | | | | | |
| 4541-158-2 | A-276 | 50 | Glass | 180 | 5 | 8 | 4 | 71 |
| | MIBK | 4 | | | | | | |
| 4541-158-3 | A-276 | 50 | CRS | 180 | 10 | 50 | 60 | 127 |
| | 1-Bromooctane | 1 | | | | | | |
| | Phenyl glycidyl ether | 1 | | | | | | |

TABLE 8-continued

| Formulation No. | Ingredient | Amt (g) | Substrate | Bake Temp. °F. | MEK Double Rubs Time (min) 5 min | 1 hr | 24 hr |
|---|---|---|---|---|---|---|---|
| 4541-158-4 | MIBK | 4 | | | | | |
| | A-276 | 50 | CRS | 150 | 10 | 3–4 | 8 | 130 |
| | 1-Bromooctane | 1 | | | | | |
| | Phenyl glycidyl ether | 1 | | | | | |
| 2 | MIBK | 4 | | | | | |

The coatings evidenced solvent pops indicating that additives to balance the coatings' properties were required. Still, evidence of cure and good gloss was present. Formulation No. 150-3, for example, had a pencil hardness of 3B twenty minutes after the bake cycle.

EXAMPLE 9

Spenlite M22-X-40 of Example 1 was formulated along with three different levels of 1-bromobutane and phenyl glycidyl ether into coatings for evaluation. Each was sprayed onto Bonderite 1000 panels along with 0.6 vol-% DMEOLA and baked for 5 minutes at 121° C. (250° F.).

TABLE 9

| Formulation No. | Ingredient | Amt (g) | MEK Double Rubs 5 min | 1 hr | 24 hr |
|---|---|---|---|---|---|
| 4641-163-1 | M-22 | 50.0 | 26 | 26 | 35 |
| | 1-Bromobutane | 1.0 | | | |
| | Phenyl glycidyl ether | 1.0 | | | |
| 4541-163-2 | M-22 | 50 | 13 | 16 | 35 |
| | 1-Bromobutane | .5 | | | |
| | Phenyl glycidyl ether | .5 | | | |
| 4541-163-3 | M-22 | 50 | 9 | 8 | 21 |
| | 1-Bromobutane | .25 | | | |
| | Phenyl glycidyl ether | .25 | | | |

Coatings 163-1 and 163-2 were tack-free from the oven and could not be marred with a fingernail. Coating 163-3 was tack free from the oven but could be marred with a fingernail. For the formulation tested, it appears that the 0.5% level of epoxy and alkylating agent in Formulation 163-3 was too low of a level for good early film development.

We claim:

1. A method for curing a curable composition which comprises:
   (a) formulating a storage-stable, liquid coating composition comprising an isocyanate-functional compound, an epoxy component, and an alkylating agent;
   (b) admixing said liquid composition with a tertiary amine; and
   (c) applying the mixture of step (b) onto a substrate, said t-amine forming a quaternary ammonium salt in situ by reacting with said epoxy component and with said alkylating agent for achieving cross-linking of said isocyanate-functional compound.

2. The method of claim 1 wherein said tertiary amine is in liquid or vaporous form.

3. The method of claim 2 comprising concurrently generating an atomizate of said liquid composition and said tertiary amine, admixing said atomizates, and applying the mixture onto a substrate.

4. The method of claim 3 wherein said tertiary amine is selected from the group consisting of triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and mixtures thereof.

5. The method of claim 1 wherein said isocyanate-functional compound is an isocyanate-functional monomer, oligomer, or polymer.

6. The method of claim 5 wherein said isocyanate-functional compound is selected from the group consisting of hexamethylene diisocyanate, 4,4'-toluene diisocyanate, diphenylmethane diisocyanate, polymethyl polyphenyl isocyanate, m- and p-phenylene diisocyanates, bitolylene diisocyanate, triphenylmethane triisocyanate, tris-(4-isocyanatophenyl) thiophosphate, cyclohexane diisocyanate, bis-(isocyanatomethyl) cyclohexane, dicyclohexylmethane diisocyanate, trimethylhexane diisocyanate, trimethyl hexamethylene diisocyanate, dimer acid diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

7. The method of claim 5 wherein said isocyanate-functional compound is an isocyanate-functional oligomer or polymer containing between about 1 and 5 percent by weight of free isocyanate groups.

8. The method of claim 1 wherein said applied mixture is heated at a temperature of between about 50° and 175° C.

9. The method of claim 1 wherein said alkylating agent is an aliphatic, cycloaliphatic, or aromatic halide, nitrate, carbonate, hydroxide, phosphate, sulfate, acetate, formate, citrate, propionate, tartrate, or mixtures thereof.

10. The method of claim 9 wherein said aliphatic alkylating agent comprises a $C_1$–$C_8$ aliphatic alkylating agent.

11. The method of claim 1 wherein the proportion of said tertiary amine ranges from between about 0.001% and 5% by weight of said isocyanate-functional compound.

12. The method of claim 1 wherein said epoxy component is selected from the group consisting of glycidyl acrylate, glycidyl methacrylate, allyl glycidyl ether, alpha-olefin epoxides, 1,4-butanediol diglycidyl ether, diglycidyl ethers of bis-phenol A, epoxy novolacs, cresyl glycidyl ether, phenyl glycidyl ether, resorcinyl diglycidyl ether, cycloaliphatic epoxides, glycidyl ethers of polyether polyols and castor oil, and mixtures thereof.

13. A curable composition which comprises:
(a) a storage-stable, liquid composition comprising an isocyanate-functional compound, an epoxy component, and an alkylating agent;
(b) a catalytic amount of a tertiary amine, upon admixing said tertiary amine with said liquid composition, said tertiary amine forming a quaternary ammonium salt in situ by reacting with said epoxy component and with said alkylating agent for achieving cross-linking of said isocyanate-functional compound.

14. The curable composition of claim 13 wherein said tertiary amine is in liquid or vaporous form.

15. The curable composition of claim 14 wherein said tertiary amine is selected from the group consisting of triethyl amine, dimethyl ethyl amine, tetramethyl ethylene diamine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, tripropyl amine, isoquinoline, N-ethyl morpholine, triethylene diamine, and mixtures thereof.

16. The curable composition of claim 13 wherein said isocyanate-functional compound is an isocyanate-functional monomer, oligomer, or polymer.

17. The curable composition of claim 16 wherein said isocyanate-functional compound is selected from the group consisting of hexamethylene diisocyanate, 4,4'-toluene diisocyanate, diphenylmethane diisocyanate, polymethyl polyphenyl isocyanate, m- and p-phenylene diisocyanates, bitolylene diisocyanate, triphenylmethane triisocyanate, tris-(4-isocyanatophenyl) thiophosphate, cyclohexane diisocyanate, bis(isocyanatomethyl) cyclohexane, dicyclohexylmethane diisocyanate, trimethylhexane diisocyanate, trimethyl hexamethylene diisocyanate, dimer acid diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

18. The curable composition of claim 16 wherein said isocyanate-functional compound is an isocyanate-functional oligomer or polymer containing between about 1 and 5 percent by weight of free isocyanate groups.

19. The curable composition of claim 13 wherein said alkylating agent is an aliphatic, cycloaliphatic, or aromatic halide, nitrate, carbonate, hydroxide, phosphate, sulfate, acetate, formate, citrate, propionate, tartrate, or mixtures thereof.

20. The curable composition of claim 19 wherein said aliphatic alkylating agent comprises a $C_1$-$C_8$ aliphatic alkylating agent.

21. The curable composition of claim 13 wherein the proportion of said tertiary amine ranges from between about 0.001% and 5% by weight of said isocyanate-functional compound.

22. The curable composition of claim 13 wherein said epoxy component is selected from the group consisting of glycidyl acrylate, glycidyl methacrylate, allyl glycidyl ether, alpha-olefin epoxides, 1,4-butanediol diglycidyl ether, diglycidyl ethers of bis-phenol A, epoxy novolacs, cresyl glycidyl ether, phenyl glycidyl ether, resorcinyl diglycidyl ether, cycloaliphatic epoxides, glycidyl ethers of polyether polyols and castor oil, and mixtures thereof.

* * * * *